US012457113B1

United States Patent
Balin et al.

(10) Patent No.: US 12,457,113 B1
(45) Date of Patent: Oct. 28, 2025

(54) SEAMLESS NETWORK CONFIDENTIALITY FOR A CONTAINERIZED APPLICATION ON EDGE INFRASTRUCTURE

(71) Applicant: Dell Products L.P., Round Rock, TX (US)

(72) Inventors: Maxim Balin, Gan-Yavne (IL); Shree Rathinasamy, Round Rock, TX (US); Eliyahu Rosenes, Bet Shemesh (IL)

(73) Assignee: Dell Products L.P., Round Rock, TX (US)

( * ) Notice: Subject to any disclaimer, the term of this patent is extended or adjusted under 35 U.S.C. 154(b) by 82 days.

(21) Appl. No.: 18/647,363

(22) Filed: Apr. 26, 2024

(51) Int. Cl.
*H04L 9/32* (2006.01)
*H04L 9/40* (2022.01)

(52) U.S. Cl.
CPC ........ *H04L 9/3242* (2013.01); *H04L 63/0236* (2013.01); *H04L 63/0245* (2013.01); *H04L 63/04* (2013.01); *H04L 63/0428* (2013.01)

(58) Field of Classification Search
CPC ............... H04L 9/3242; H04L 63/0236; H04L 63/0245; H04L 63/04; H04L 63/0428
USPC .......................................................... 713/171
See application file for complete search history.

(56) References Cited

U.S. PATENT DOCUMENTS

| | | | | |
|---|---|---|---|---|
| 9,973,515 | B1* | 5/2018 | Corbett | H04L 63/0236 |
| 2001/0012296 | A1* | 8/2001 | Burgess | H04L 63/0236 370/392 |
| 2005/0125692 | A1* | 6/2005 | Cox | H04L 63/0272 726/4 |
| 2010/0232322 | A1* | 9/2010 | Umayabashi | H04L 12/462 370/256 |
| 2016/0080380 | A1* | 3/2016 | Dawoud Shenouda Dawoud | H04L 9/3265 713/156 |
| 2017/0099662 | A1* | 4/2017 | Thubert | H04L 63/0407 |
| 2018/0292522 | A1* | 10/2018 | Cavendish | H04W 12/06 |
| 2019/0052636 | A1* | 2/2019 | Wang | H04L 63/0236 |
| 2019/0089693 | A1* | 3/2019 | Ding | G06F 21/44 |
| 2019/0239221 | A1* | 8/2019 | Ujiie | H04L 12/40 |
| 2020/0099671 | A1* | 3/2020 | Shaw | H04L 63/061 |
| 2020/0358699 | A1* | 11/2020 | Friedman | H04L 63/0263 |
| 2021/0297433 | A1* | 9/2021 | Yang | H04L 12/4641 |
| 2024/0039932 | A1* | 2/2024 | Torisaki | H04L 63/102 |
| 2024/0223532 | A1* | 7/2024 | Zhang | H04L 63/101 |
| 2024/0244044 | A1* | 7/2024 | Kim | H04L 63/029 |
| 2025/0039177 | A1* | 1/2025 | Kim | H04L 9/40 |

* cited by examiner

*Primary Examiner* — Thanh T Le

(74) *Attorney, Agent, or Firm* — WOMBLE BOND DICKINSON (US) LLP

(57) ABSTRACT

Methods and systems for managing operation of endpoint devices are disclosed. The operation of the endpoint devices may be managed using a security framework. The security framework may be used to transparently encrypt and decrypt application data transmitted via a network without requiring the applications to participate in the encryption and decryption. Additionally, the security framework may facilitate screening of network traffic for malicious traffic. The traffic may be screened using information inserted into reserved fields of control information from network data units. The reserved fields may be used to store data based on network information for originating entities.

20 Claims, 7 Drawing Sheets

SEAMLESS NETWORK CONFIDENTIALITY FOR A CONTAINERIZED APPLICATION ON EDGE INFRASTRUCTURE

FIELD

Embodiments disclosed herein relate generally to device management. More particularly, embodiments disclosed herein relate to systems and methods to onboard devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
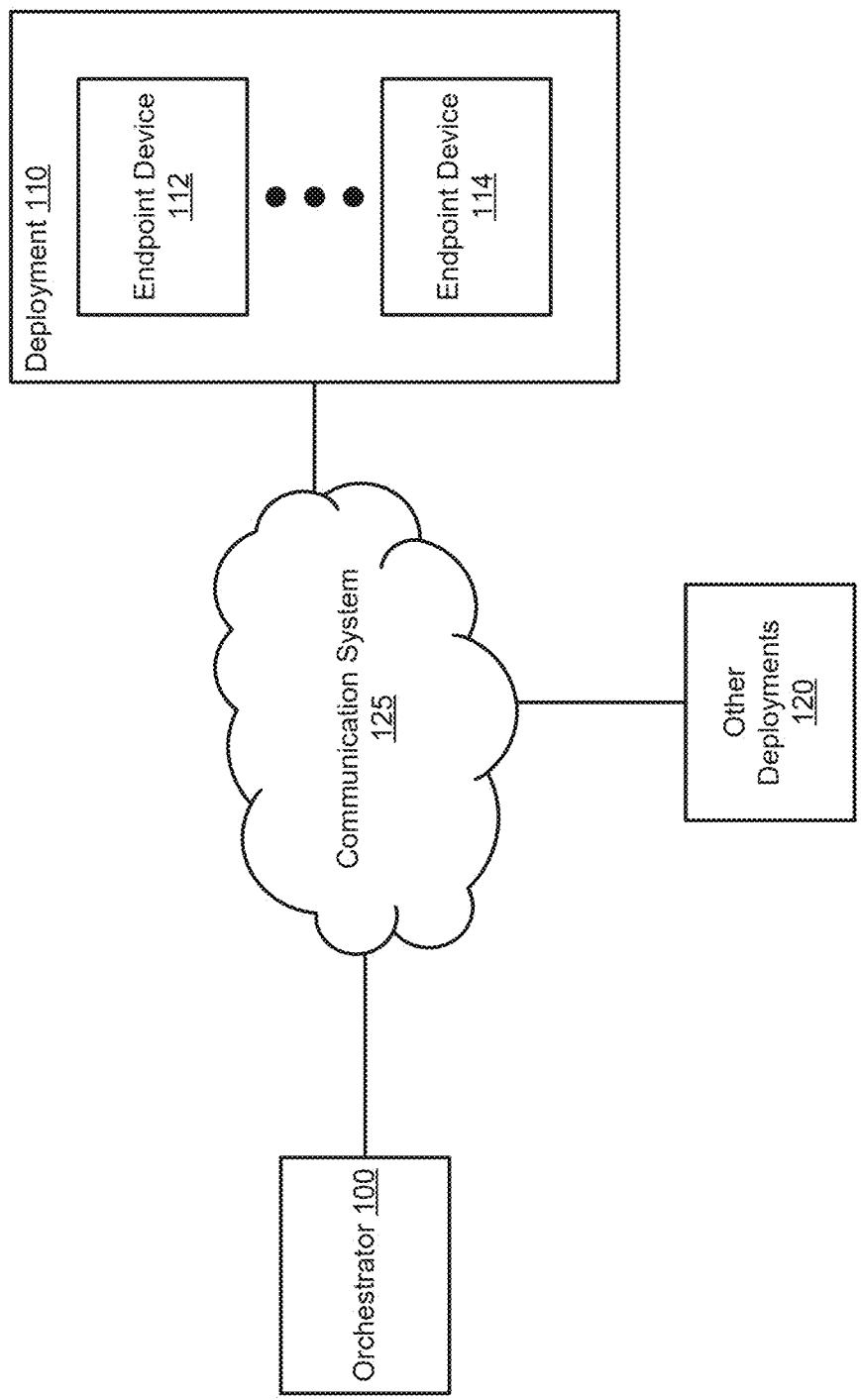
FIGS. 1A-1B show block diagrams illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, various endpoint devices may perform various actions and communicate with one another. Such communications and actions may serve as a vector of attack on the endpoint devices.

To reduce the likelihood of the attacks being successful, a system in accordance with an embodiment may utilize a security framework. The security framework may seamlessly and transparently facilitate encryption and decryption of data transmitted between the network devices. Additionally, the security framework may screen network traffic for malicious traffic. The screening may be performed using whitelists. Traffic that cannot be matched to the whitelists may be dropped.

By doing so, endpoint devices may be less likely to be compromised while cooperatively working to provide desired computer implemented services. Thus, embodiments disclosed here may address, in addition to others, the technical problem of security in a distributed system where malicious communications may exist by virtue of the network environment.

In an embodiment, a method for managing operation of a deployment is provided. The method may include obtaining application data from an application hosted by a first container, the application data being destined for a second container; obtaining a first hash of a first media access control address associated with the second container; making a determination regarding whether the first hash is trusted; in a first instance of the determination where the first hash is trusted: encrypting the application data using an encryption key; obtaining a second hash of a second media access control address associated with the first container; packaging the encrypted application as a payload of a network data unit and the second hash in a field of control information of the network data unit; and sending the network data unit to the second container to facilitate provisioning of computer implemented services.

The method may also include in a second instance of the determination where the first hash is not trusted: preventing sending of the application data to the second container.

The method may also include obtaining a second network data unit; extracting a third hash from control information of the second network data unit; attempting to match the third hash to trusted hashes; in an instance of the attempting where the third hash cannot be matched to any of the trusted hashes: dropping the network data unit.

The first media access control address may be virtual.

The first container and the second container may be operably connected to each other via an overlay network.

The overlay network may be a virtual extensible local area network.

The control information may include a reserved field, and the second hash is stored in the reserved field.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance the computer-implemented method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include various distributed components. The components may cooperate to provide the computer implemented services.

To cooperate, the components may send messages to one another. The messages may include information regarding actions to be performed, information used in performing actions, and/or other types of information.

However, malicious entities may attempt to compromise various components of the distributed system by sending various messages, intercepting messages sent by legitimate components, and/or performing other types of malicious network activity. If such messages are used by the components of the distributed system, the components and/or services provided by the distributed system may become compromised.

In general, embodiments disclosed herein may provide methods, systems, and/or devices for managing the operation of distributed systems to provide computer implemented services. To manage the distributed system, a framework may be enforced across the distributed system. The framework may (i) automatically and/or transparently enforce use of encryption for payloads transmitted between components of the distributed system, and (ii) automatically and/or transparently limit communications within the system. By doing so, the distributed system may be more likely to be able to provide desired computer implemented services without being compromised.

To provide the above noted functionality, the system of FIG. 1A may include orchestrator 100, deployment 110, other deployments 120, and communication system 125. Each of these components is discussed below.

Deployment 110 (and/or other deployments 120) may provide desired computer implemented services. To do so, deployment 110 may include any number of endpoint devices (e.g., 112-114) that may cooperatively and/or independently provide the computer implemented services. The endpoint devices may host various software (e.g., executing applications) that may send and receive data as part of their operation in providing desired computer implemented services. The applications may be containerized.

Figure 1B:
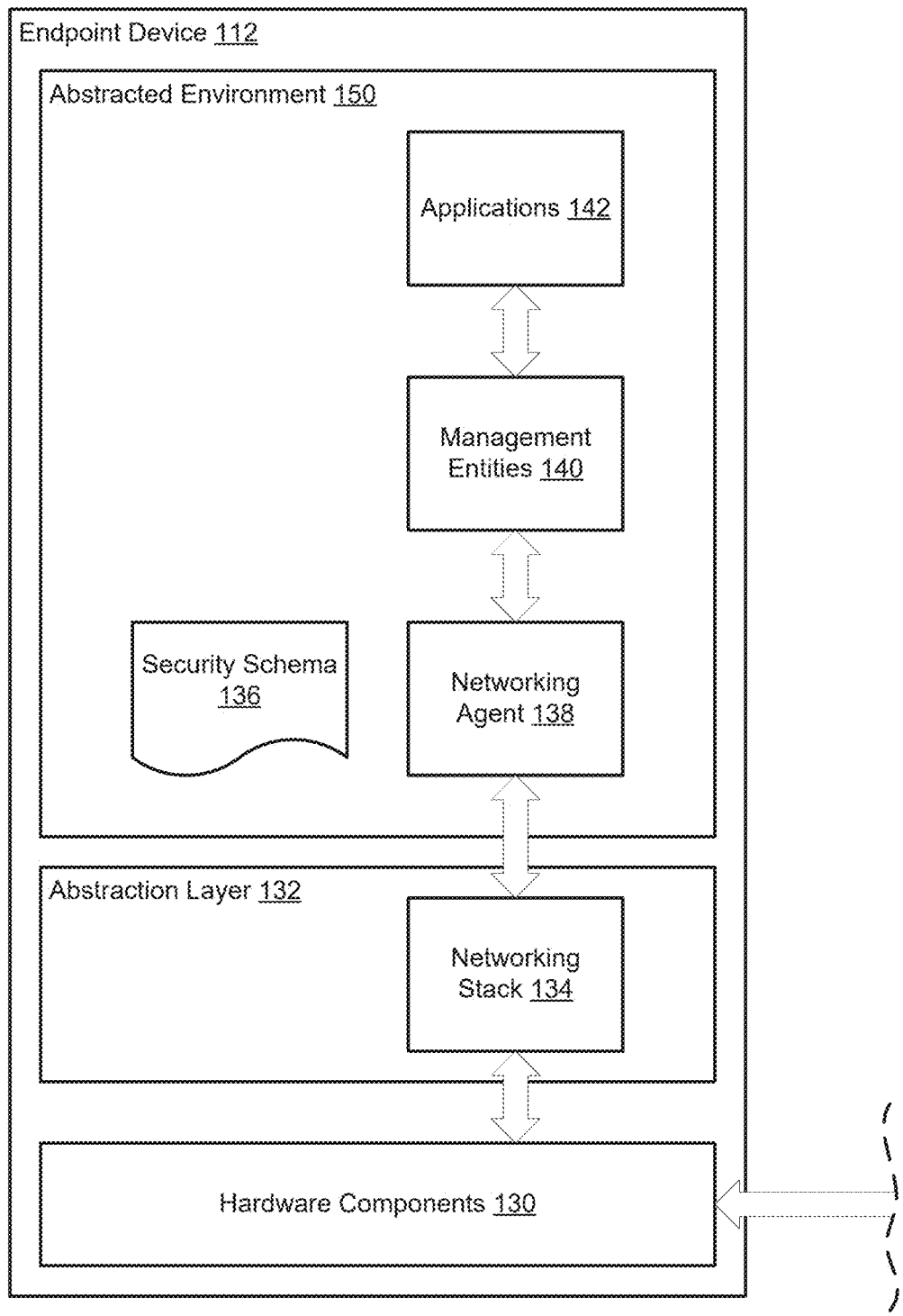

To reduce the likelihood of communications sent between applications being used as attack vectors on deployment 110, each of the endpoint devices (e.g., 112-114) may host software components to implement the framework. Refer to FIG. 1B for additional details regarding the software components that implement the framework.

To communicate with each other, the endpoint devices may be operably connected to one another and other endpoint devices (e.g., of other deployments 120) via communication system 125. To facilitate such communications, an overlay network such as a virtual extensible local area network may be used. In such a network, each container may be assigned a virtual media access control address, and multiple local area networks may be connected to one another via virtual tunnel endpoints. The overlay network may facilitate network data unit (e.g., packets) routing between containers in such an environment.

Other deployments 120 may be similar to deployment 110. Each of these deployments may provide similar and/or different computer implemented services, and any of the endpoint devices within these environment may communication with one another to provide any of the computer implemented services. The deployments may each include local area network interconnected via an internet protocol or higher level network. The overlay network may be used to ensure each container within this environment is easily addressable.

Orchestrator 100 may manage operation of the deployments (e.g., 110, 120). To do so, orchestrator 100 may (i) manage the overlay networks (e.g., assign virtual media access control addresses to containers, instantiate virtual tunnel endpoints, maintain and distribute network information for the overlay network, etc.), (ii) establish communication schemas for the framework, and/or perform other types of management functions.

When providing their functionality, any of (and/or components thereof) orchestrator 100, deployment 110, and other deployments 120 may perform all, or a portion, of the actions and methods illustrated in FIGS. 2A-3B.

Any of (and/or components thereof) orchestrator 100, deployment 110, and other deployments 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 125. In an embodiment, communication system 125 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Turning to FIG. 1B, a diagram of endpoint device 112 in accordance with an embodiment is shown. Any of the endpoint devices of the system of FIG. 1A may be similar to endpoint device 112.

To provide desired computer implemented services, endpoint device 112 may include any type and quantity of hardware components 130 (e.g., processors, memory modules, etc.). Hardware components 130 may support execution of various applications 142 which may provide the computer implemented services.

Applications 142 may be hosted by abstracted environment 150. Abstracted environment 150 may be a container, virtual machine, or other environment that provides abstracted access and use of hardware components 130.

Abstracted environment 150 may include various management entities 140 (e.g., drivers) to facilitate use of the aforementioned hardware components.

To facilitate hosting of multiple abstracted environment, endpoint device 112 may host abstraction layer 132. Abstraction layer 132 may orchestrate shared access and use of hardware components 130. For example, abstraction layer 132 may be hypervisor for virtual machines, or docker for containers.

During operation, applications 142 may need to communicate with other applications hosted by other applications. To do so, applications 142 may generate application data to be sent to the other applications hosted by the other entities.

Such data may be passed to management entities 140, which may typically push the data to a networking stack (e.g., 134) which may package the data for transmission. However, abstracted environment 150 may host a networking agent 138. Networking agent 138 may intercept data flowing to and/or from networking stack 134.

Networking agents 138 may (i) automatically encrypt/decrypt application data so that it never flows over the network in plain text form (e.g., even if transmitted over encrypted communications links, such links may be compromised), and (ii) screen the flows of data using security schema 136. Security schema 136 may include information usable to discriminate flows of data that are to be screened from others that are to be allowed to pass. Security schema 136 may include a whitelist of media access control addresses and/or hashes thereof that are authorized to communicate. If a flow of data is not associated with whitelisted media access control address (e.g., sources or destinations for the data flows), then the data flows may be screened. The whitelisted media access control addresses may include virtual media access control addressed of containers hosted by endpoint devices that provide desired computer implemented services.

Fore example, an orchestrator managing a deployment may assign or identify the virtual media access control addresses assigned to each of the containers/abstracted environments. The orchestrator may select the content for security schema 136 such that flows of data that are not from or directed toward one of the containers managed by the orchestrator are dropped.

Thus, when communications are obtained/sent by networking stack 134, the communications may be screened based on the whitelists. By doing so, communications from entities that may be malicious may be automatically screened.

Security schema 136 may also include information usable to encrypt/decrypt application data. For example, security schema 136 may include or include information usable to obtain encryption/decryption keys. Thus, networking agents (e.g., 138) hosted by abstracted environment 150 may be able to cooperatively encrypt and decrypt data, without involvement from applications 142 and/or networking stack 134. Accordingly, the process may be transparent from the viewpoint of application developers, because the application developers may not need to integrate in encryption/decryption functionality into applications.

Figure 2A:
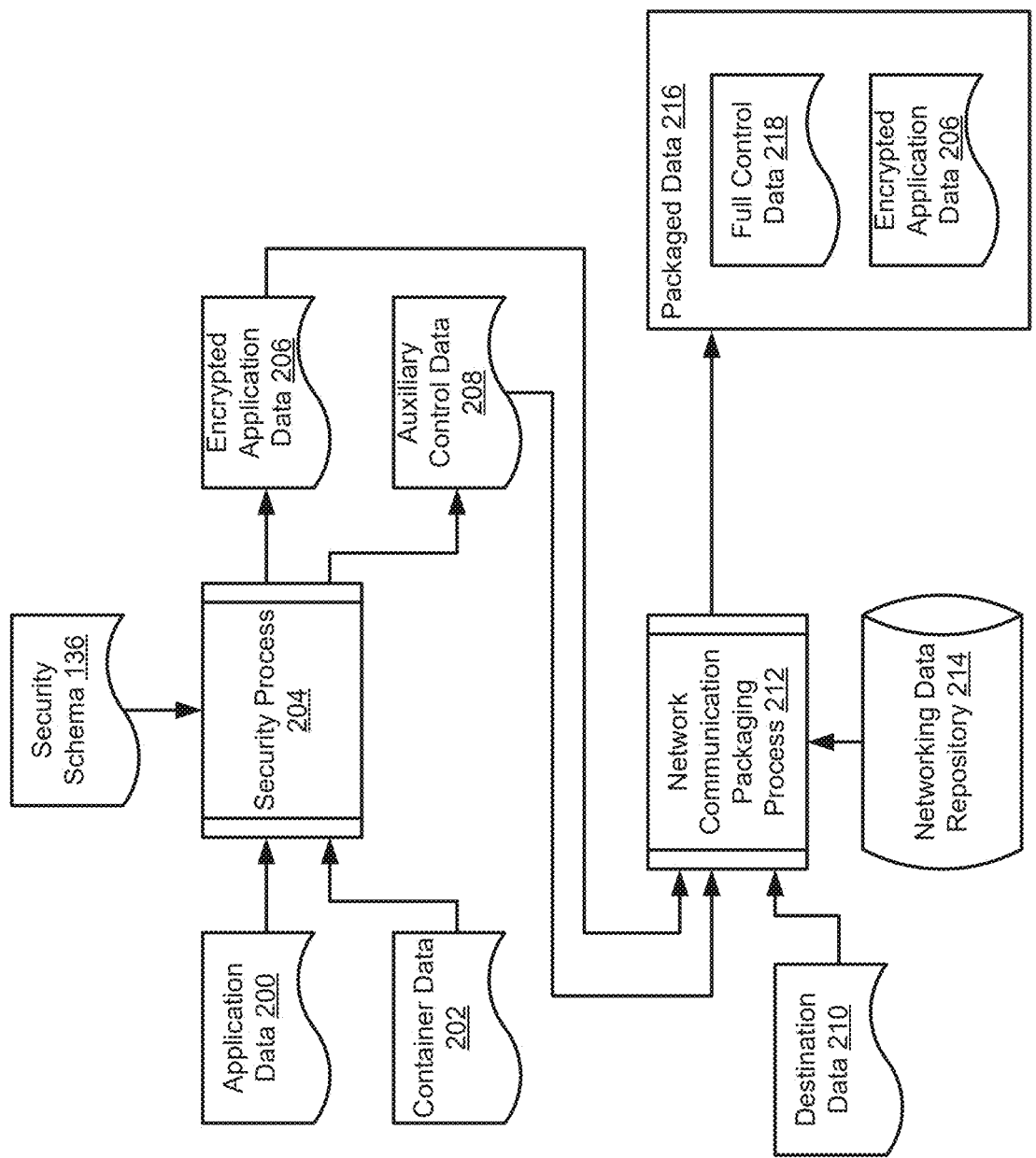
FIGS. 2A-2B shows data flow diagrams illustrating data flows and data processing in accordance with an embodiment.
Figure 2B:
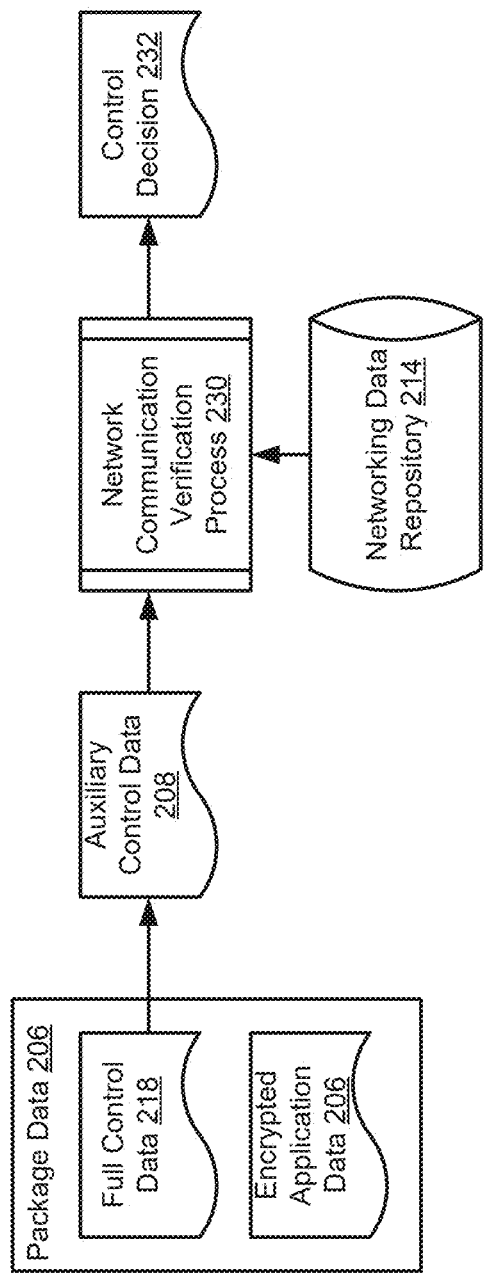

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 202, etc.) is used to represent data structures, a second set of shapes (e.g., 204, 212, etc.) is used to represent processes performed using and/or that generate data, and a third set of shapes (e.g., 214, etc.) is used to represent large scale data structures such as databases.

Turning to FIG. 2A, a first data flow diagram in accordance with an embodiment is shown. The first data flow diagram may illustrate data used in and data processing performed in sending data between containers.

To send data between containers, application data 200 from a container that is to be provided to another container (e.g., directed to an application hosted by the other container) may be intercepted by an agent. When intercepted, security process 204 may be performed. During security process, (i) application data 200 may be encrypted to obtained encrypted application data 206, and (ii) container data 202 which may include a media access control address for the container that originated application data 200 may be hashed to obtained auxiliary control data 208. Security schema 136 may include information that defines how (e.g., which encryption key to use, which encryption scheme to use, etc.) application data 200 is encrypted, and how (e.g., which hash algorithm to use, etc.) the hash for auxiliary control data 208 is generated.

Once obtained, network communication packaging process 212 may be performed to obtain packaged data 216 (e.g., a network data unit). During network communication packaging process 212, encrypted application data 206 may be added as a payload to packaged data 216. Additionally, destination data 210 (e.g., the container/application to which application data 200 is to be sent), information from networking data repository 214, and auxiliary control data 208 may be used to obtain full control data 218. Networking data repository 214 may include any type and quantity of information regarding a network environment in which a container exists. For example, networking data repository 214 may include information regarding how to send data via an overlay network, may include hashes of media access control addresses for containers, etc.

To obtain full control data 218, a header (e.g., for the overlay network communications, such as a full overlay network encapsulation frame) may initially be populated based on the destination data (e.g., 210) and the networking data repository 214 information. The header may include, for example, an outer ethernet header, an outer internet protocol header, an outer UDP header, and a virtual extensible local area network header. The payload may include, for example, an Ethernet frame with the encrypted application data 206. Thus, the outer header may facilitate transport over an IP network interconnecting a local area network on which the destination is available.

Once initially populated, the auxiliary control data 208 may be added to a reserved field of the overlay network header. When so added, endpoint devices of the system may be configured to automatically compare the information in this reserved field to whitelists of hashed media access control addresses for trusted containers. If the hashed media access control address is not in the whitelist, then the packaged data 216 may be dropped. Refer to FIG. 2B for additional details regarding analysis of network data units.

Once generated (and presuming that the auxiliary control data 208 is in the whitelist), packaged data 216 may be sent via a network toward the destination.

Once at the destination and after removal of the header/other encapsulation data, encrypted application data 206 may be directed toward a destination (e.g., an application in a container). However, before reaching the destination, encrypted application data 206 may be intercepted and decrypted (e.g., by another agent hosted by the destination endpoint device). Once decrypted, the application data may be directed toward a target.

Thus, using the flows illustrated in FIG. 2A, embodiments disclosed herein may reduce the likelihood of data transmission being used as attack vectors for distributed systems.

Turning to FIG. 2B, a second data flow diagram in accordance with an embodiment is shown. The second data flow diagram may illustrate data used in and data processing performed in analysis of network data unit traffic.

As network data units traverse an overlay network, endpoint devices along the way may check the network data units to see if they are trustworthy. To do so, an endpoint device may extract, from full control data 218, auxiliary control data 208. As discussed above, the auxiliary control data 208 may be a hash of a media access control address of a container (e.g., originating container).

Once obtained, auxiliary control data 208 may be ingested by network communication verification process 230. During network communication verification process 230, auxiliary control data 208 may attempt to be matched against a whitelist of trusted data (e.g., hashes of media access control addresses of containers managed by an orchestrator stored in networking data repository 214). If successfully matched, then a control decision (e.g., 232) may be made that packaged data 216 is trustworthy. However, if not successfully made, then the control decision may be made that packaged data 216 is not trustworthy.

If found to be trustworthy, then packaged data 216 may be forwarded toward a destination location. However, if found to not be trustworthy, then packaged data 216 may be dropped.

Thus, via the flow illustrated in FIG. 2B, endpoint device may identify and screen communications that may be malicious in nature in containerized environments where communications flow over an overlay network.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
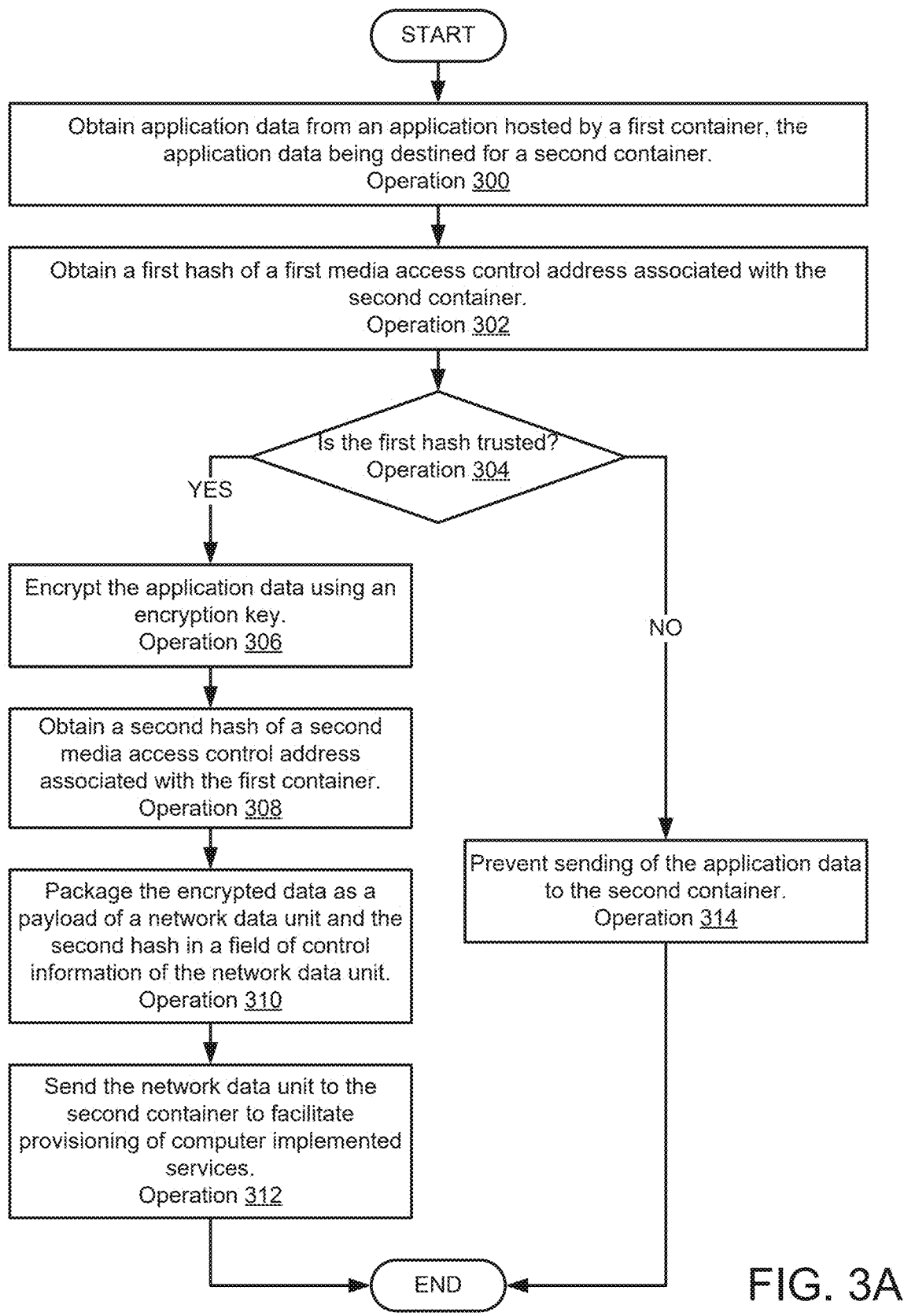
FIGS. 3A-3B show flow diagrams illustrating methods in accordance with an embodiment.
Figure 3B:
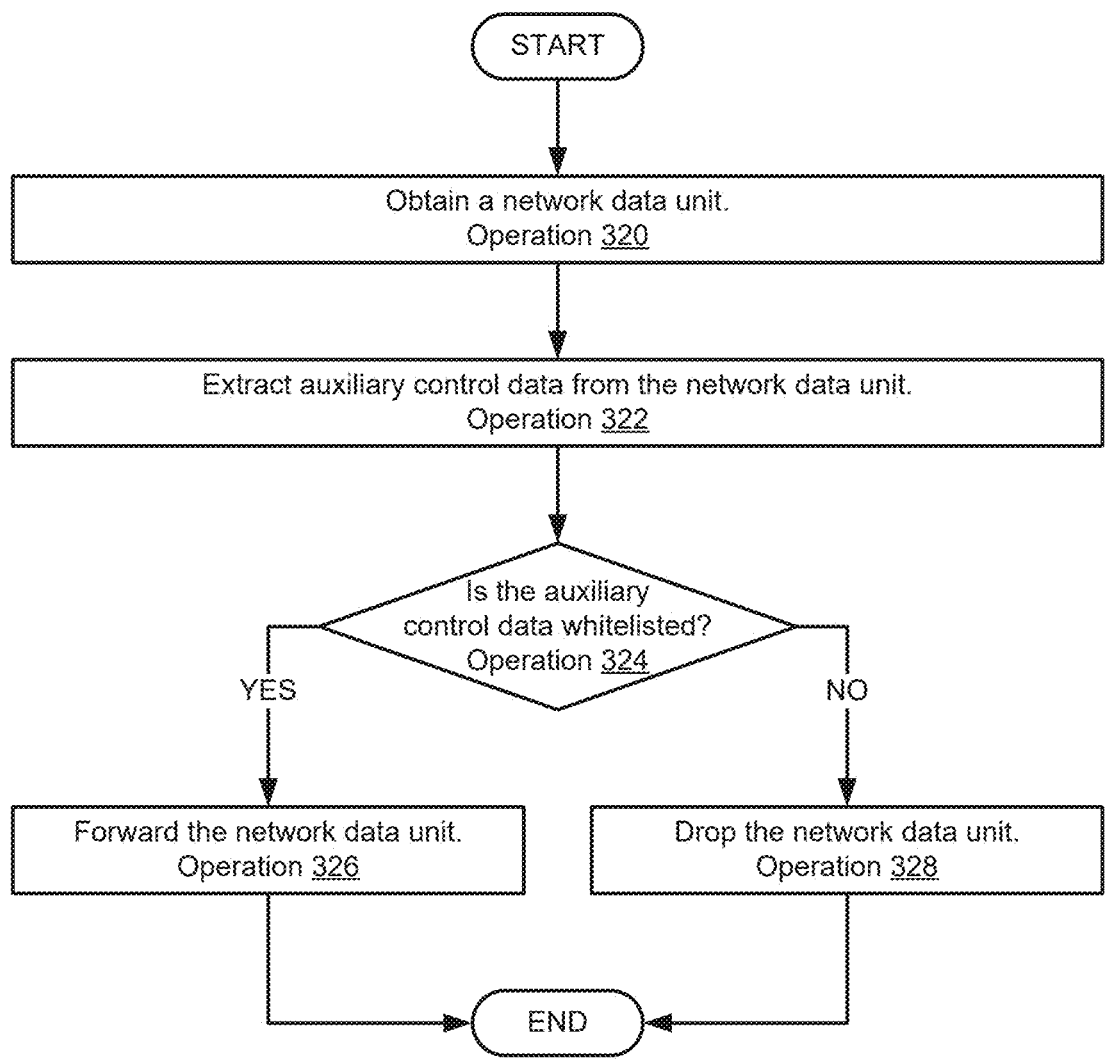

As discussed above, the components of FIG. 1A may perform various methods to manage communication between of endpoint devices to screen for malicious activity. FIGS. 3A-3B illustrates methods that may be performed by the components of the system of FIGS. 1A-1B. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method for managing a system in accordance with an embodiment is shown. The method may be performed by any of the components of the system shown in FIGS. 1A-1B.

At operation 300, application data from an application hosted by a first container is obtained. The application data may be destined for a second container. The application data may be obtained by intercepting it. The application data may be generated by an application hosted by a container. The application may be intercepted while in transit to the second container (e.g., may be hosted by a container of a remote endpoint device), but before packaging (completely) via a network stack for transmission.

At operation 302, a first hash of a first media access control address associated with the second container is obtained. The first hash may be obtained using a hash algorithm.

At operation 304, a determination is made regarding whether the first hash is trusted. The determination may be made by attempt to match the first hash against a whitelist of trusted hashes of media access control address of a collection of trusted container. If successfully matched, then the first hash may be trustworthy. Otherwise, the first hash may not be trusted.

If found to be trusted, the method may proceed to operation 306. Otherwise the method may proceed to operation 314.

At operation 306, the application data is encrypted using an encryption key. The application data may be encrypted using an encryption algorithm.

At operation 308, a second hash of a second media access control address associated with the first container is obtained. The second hash may also be obtained using a hashing algorithm.

At operation 310, the encrypted data is packaged as a payload of a network data unit, and the second hash is packaged in a field of control information of the network data unit. The encrypted data may be part of the payload by adding it (e.g., as part of encapsulation for network transport). The second hash may be added to a reserved field of a header associated with an overlay network used by the trusted containers to communicate with one another.

At operation 312, the network data unit is sent to the second container to facilitate provisioning of computer implemented services. For example, the control information from the network data unit may enable network transport via the overlay network.

The method may end following operation 312.

Returning to operation 304, the method may proceed to operation 314 following operation 304 if the first hash is not trusted.

At operation 314, the application data is prevented from being sent to the second container.

The method may end following operation 314.

Thus, via the method illustrated in FIG. 3A, application data may be encrypted and prepared for network transport in a format that facilitates identification of trustworthy and untrustworthy traffic using the whitelist.

Turning to FIG. 3B, a second flow diagram illustrating a method for managing traffic in accordance with an embodiment is shown. The method may be performed by any of the components of the system shown in FIGS. 1A-1B.

At operation 320, a network data unit is obtained. The network data unit may be obtained as traffic traversing an overlay network. In other words, the network data unit may be obtained by receiving it from another endpoint device, or container.

At operation 322, auxiliary control data form the network data unit is extracted. The auxiliary control data may be extracted by reading the auxiliary control data from a reserved field of a header of the network data unit.

At operation 324, a determination is made regarding whether the auxiliary control data is whitelisted. The determination may be made by matching the auxiliary control data (e.g., a hash value) against a whitelist of trusted hash values of media access control addresses of trusted containers. If a match is found, then the auxiliary control data is whitelisted.

If the auxiliary control data is whitelisted, then the method may proceed to operation 326. Otherwise the method may proceed to operation 328.

At operation 326, the network data unit is forwarded (e.g., to a container, to another endpoint device/network device, etc.).

The method may end following operation 326.

Returning to operation 324, the method may proceed to operation 328 if the auxiliary control data is not whitelisted (e.g., not appearing in the whitelist).

At operation 328, the network data unit is dropped.

The method may end following operation 328.

Thus using the method illustrated in FIG. 3B, embodiments disclosed herein may screen malicious traffic traversing an overlay network.

Figure 4:
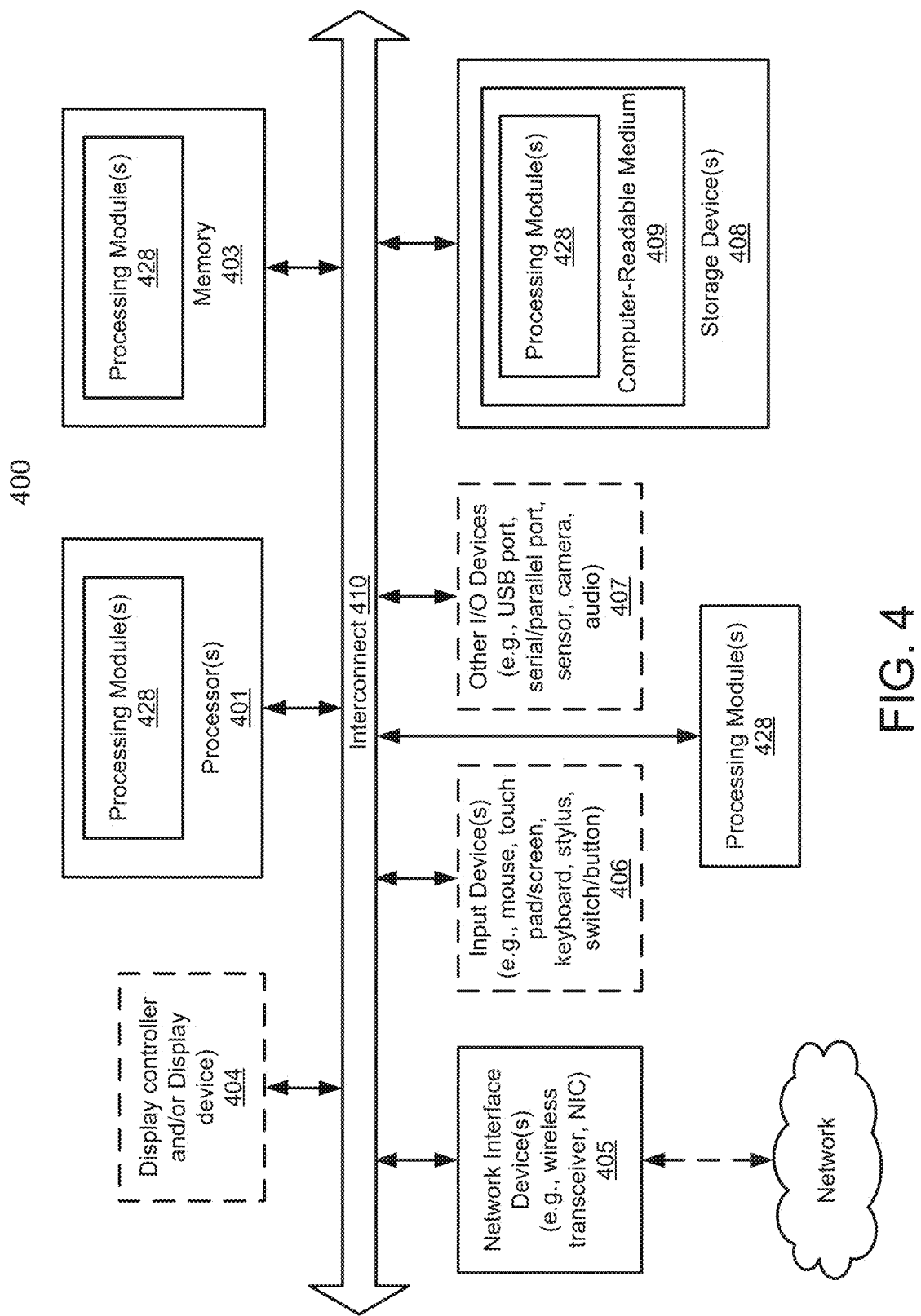
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a deployment, the method comprising:
   obtaining application data from an application hosted by a first container, the application data being destined for a second container;
   obtaining a first hash of a first media access control address associated with the second container;
   making a determination regarding whether the first hash is trusted;
   in a first instance of the determination where the first hash is trusted:
     encrypting the application data using an encryption key;
     obtaining a second hash of a second media access control address associated with the first container;
     packaging the encrypted application as a payload of a network data unit and the second hash in a field of control information of the network data unit; and
     sending the network data unit to the second container to facilitate provisioning of computer implemented services.

2. The method of claim 1, further comprising:
   in a second instance of the determination where the first hash is not trusted:
     preventing sending of the application data to the second container.

3. The method of claim 1, further comprising:
   obtaining a second network data unit;
   extracting a third hash from control information of the second network data unit;
   attempting to match the third hash to trusted hashes;
   in an instance of the attempting where the third hash cannot be matched to any of the trusted hashes:
     dropping the network data unit.

4. The method of claim 1, wherein the first media access control address is virtual.

5. The method of claim 1, wherein the first container and the second container are operably connected to each other via an overlay network.

6. The method of claim 5, wherein the overlay network is a virtual extensible local area network.

7. The method of claim 5, wherein the control information comprises a reserved field, and the second hash is stored in the reserved field.

8. A non-transitory machine-readable medium having instructions stored therein, which when executed by a processor, cause operations to be performed, the operations comprising:
   obtaining application data from an application hosted by a first container, the application data being destined for a second container;
   obtaining a first hash of a first media access control address associated with the second container;
   making a determination regarding whether the first hash is trusted;
   in a first instance of the determination where the first hash is trusted:
     encrypting the application data using an encryption key;
     obtaining a second hash of a second media access control address associated with the first container;
     packaging the encrypted application as a payload of a network data unit and the second hash in a field of control information of the network data unit; and
     sending the network data unit to the second container to facilitate provisioning of computer implemented services.

9. The non-transitory machine-readable medium of claim 8, wherein the operations further comprise:
   in a second instance of the determination where the first hash is not trusted:
     preventing sending of the application data to the second container.

10. The non-transitory machine-readable medium of claim 8, wherein the operations further comprise:
    obtaining a second network data unit;
    extracting a third hash from control information of the second network data unit;
    attempting to match the third hash to trusted hashes;
    in an instance of the attempting where the third hash cannot be matched to any of the trusted hashes:
      dropping the network data unit.

11. The non-transitory machine-readable medium of claim 8, wherein the first media access control address is virtual.

12. The non-transitory machine-readable medium of claim 8, wherein the first container and the second container are operably connected to each other via an overlay network.

13. The non-transitory machine-readable medium of claim 12, wherein the overlay network is a virtual extensible local area network.

14. The non-transitory machine-readable medium of claim 12, wherein the control information comprises a reserved field, and the second hash is stored in the reserved field.

15. An endpoint device, comprising:
    a processor; and
    a memory coupled to the processor to store instructions, which when executed by the processor, cause operations to be performed, the operations comprising:
      obtaining application data from an application hosted by a first container, the application data being destined for a second container;
      obtaining a first hash of a first media access control address associated with the second container;
      making a determination regarding whether the first hash is trusted;
      in a first instance of the determination where the first hash is trusted:
        encrypting the application data using an encryption key;
        obtaining a second hash of a second media access control address associated with the first container;
        packaging the encrypted application as a payload of a network data unit and the second hash in a field of control information of the network data unit; and
        sending the network data unit to the second container to facilitate provisioning of computer implemented services.

16. The endpoint device of claim 15, wherein the operations further comprise:
    in a second instance of the determination where the first hash is not trusted:

preventing sending of the application data to the second container.

17. The endpoint device of claim 15, wherein the operations further comprise:
obtaining a second network data unit;
extracting a third hash from control information of the second network data unit;
attempting to match the third hash to trusted hashes;
in an instance of the attempting where the third hash cannot be matched to any of the trusted hashes:
dropping the network data unit.

18. The endpoint device of claim 15, wherein the first media access control address is virtual.

19. The endpoint device of claim 15, wherein the first container and the second container are operably connected to each other via an overlay network.

20. The endpoint device of claim 19, wherein the overlay network is a virtual extensible local area network.

\* \* \* \* \*